United States Patent Office 3,184,479
Patented May 18, 1965

---

3,184,479
PROCESS FOR THE PREPARATION OF 2:5-FURANDICARBOXYLIC ACID
Erich Matter, Basel, Switzerland, assignor to Ciba Limited, Basel, Switzerland
No Drawing. Filed Apr. 29, 1964, Ser. No. 363,603
Claims priority, application Switzerland, Mar. 7, 1961, 2,727/61
5 Claims. (Cl. 260—347.3)

This is a continuation-in-part of my application Serial No. 177,254, filed March 5, 1962, now abandoned.

Various methods have already been proposed for the manufacture of 2:5-furandicarboxylic acid by dehydrating tetrahydroxy-butane-dicarboxylic acids. Thus, for example, it has been proposed to boil monopotassium saccharate with hydrobromic acid of 60% strength for 36 hours, whereby 2:5-furandicarboxylic acid is obtained in a yield of about 56%. However, this known process is not suitable for the economical manufacture of 2:5 furandicarboxylic acid on an industrial scale because it requires the use of costly hydrobromic acid which, after the saccharic acid has been dehydrated, must be recovered from the reaction mixture and regenerated by special operations with the use of special apparatus.

According to another known process for the manufacture of 2:5-furandicarboxylic acid, mucic acid is heated with twice its own weight of concentrated sulfuric acid for 40 minutes at 133 to 137° C. [cf. Yoder et al., Chemische Berichte, vol. 34 (1901), pages 3446–3449]. In this process—which gives a maximum yield of 24% of 2:5-furandicarboxylic acid—a particularly large share of the dehydrated products is further decomposed by the sulfuric acid during the strongly exothermic reaction with sulfuric acid. When said process is performed on a large scale, it is extremely difficult to control the strongly exothermic reaction accurately. Moreover, in the last-mentioned process there are always obtained sludge-like reaction mixtures, the working up of which takes considerable time and involves serious difficulties because they are very difficult to filter.

It has now been found that 2:5-furan-dicarboxylic acid can be manufactured in an advantageous manner by eliminating 3 molecular proportions of water from 1 molecular proportion of a tetrahydroxy-butane-dicarboxylic acid of the formula

HOOC—(CHOH)$_4$—COOH by means of concentrated sulfuric acid according to the process which comprises first eliminating two molecular proportions of water from one molecular proportion of the tertahydroxy-butane-dicarboxylic acid by heating said dicarboxylic acid in admixture with concentrated sulfuric acid in a first step at a temperature of 85 to 95° C. and in a second step at a temperature of 105 to 115° C., and then eliminating the third molecular proportion of water by heating the reaction mixture at a temperature ranging from 125 to 135° C.

As tetrahydroxy-butane-dicarboxylic acid of the formula

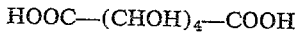
HOOC—(CHOH)$_4$—COOH suitable for use in the present process there may be mentioned mannosaccharic acid, idosaccharic acid, talomucic acid, allomucic acid and more especially the readily accessible saccharic acid and mucic acid, that is to say dicarboxylic acids derived from aldohexoses. Particularly good results are obtained when a reaction mixture is used that has been prepared by adding a monopotassium saccharate to concentrated sulfuric acid.

If desired, further suitable substances, such as zinc sulfate or aluminum sulfate, may be added to the reaction mixture. The sulfuric acid used for the elimination of water according to the invention should be as concentrated as possible and be, for example, at least of 90% strength. It is of advantage to use sulfuric acid monohydrate, i.e., sulfuric acid of 100% strength.

The working up of the reaction mixture obtained on completion of the dehydration is simple: The reaction mixture can be cooled, diluted with water and then, for example, suctioned off through a glass filter within a short time. The crude furandicarboxylic acid can be purified, for example, by way of its calcium salt or disodium salt.

Parts and percentages in the following examples are by weight.

Example 1

A stirring vessel is charged with 1200 parts of sulfuric acid monohydrate and within 15 minutes 496 parts of monopotassium saccharate are stirred in, during which the temperature rises to 50–60° C. The mixture is heated on an oil bath and stirred for 90 mintues at 85–95° C. Monopotassium saccharate dissolves and turns black.

The temperature is then raised further and the reaction mixture is stirred for 2 hours at 105–115° C.

To complete the reaction the batch is stirred for 30 to 45 minutes at 128–133° C., whereupon it forms a black, thickly liquid substance.

On completion of the dehydration the mixture is allowed to cool to 90 to 95° C., and in the course of 10 to 15 minutes 1200 parts of water are added. The mixture is cooled to room temperature and suctioned through a glass filter. This operation takes very little time, namely from 2 to 10 minutes.

The black suction filter cake is carefully washed with 5 x 200 parts of water and then stirred in a vessel with 2500 parts of hot water. At 60 to 70° C. calcium hydroxide is added until the mixture gives an alkaline reaction to phenolphthalein (about 170 to 230 parts). 12 parts of active carbon are then added and the whole is stirred for 30 minutes at 80 to 85° C., then suctioned on a steam-heated china filter and the suction filter cake is washed with 3 x 200 parts of water heated at 80 to 90° C.

After having been suction-filtered, the black substance is once more stirred with 2500 parts of hot water. If necessary, some more calcium hydroxide is added and the whole is stirred for 30 minutes at 80–85° C. The undissolved material is suctioned off while still hot and washed with 3 x 200 parts of hot water. The combined yellow or orange-colored filtrates are heated in a vessel to 70 to 80° C.

In the course of 10 minutes 450 parts of concentrated hydrochloric acid are stirred in, whereupon 2:5-furandicarboxylic acid is precipitated in the form of substantially colorless crystals. The pH value of the solution should be 0.8 to 1.1.

After cooling to room temperature the precipitated 2:5-furandicarboxylic acid is suctioned off and washed with 3 x 200 parts of water.

The yield of dried 2:5-furandicarboxylic acid amounts to 159 parts. 2:5-furandicarboxylic acid begins to sublime at 320 to 322° C.

The strength of the product, determined by titration is 99.7 to 99.9%.

Example 2

In a stirring vessel 1300 parts of concentrated sulfuric acid (96%) are mixed with 496 parts of monopotassium saccharate.

While stirring the mixture, it is heated for 2 hours at 90 to 95° C. and then for 2 hours at 105 to 115° C.

The mixture is then heated for 20 minutes at 128 to 133° C. and allowed to cool. At 90° C., 1200 parts of water are run in within 10 minutes. The whole is left to itself overnight, then suctioned through a glass filter, washed with cold water, and the suction filter cake is suspended with 1800 parts of water. At 60 to 70° C. the mixture is adjusted with about 550 parts of sodium hydroxide solution of 30% strength to a pH value of 5.0 to 5.5, mixed with 15 parts of active carbon, and stirred for 30 minutes at about 70° C.

The batch is suction-filtered, washed with water, and the black, granular suction filter cake is once more stirred with 1800 parts of water at 70° C. If necessary, the pH value is adjusted to 4.8–5.5.

After suction-filtration the filtrates are combined and at 70 to 80° C. 2:5-furandicarboxylic acid is precipitated with 400 parts of sulfuric acid of 50% strength. The precipitated 2:5-furandicarboxylic acid is suctioned off and dried in a vacuum cabinet. Yield: 149 to 167 parts.

*Example 3*

1100 parts of concentrated sulfuric acid (96%) are introduced in a stirring flask and 420 parts of mucic acid are stirred in. The mixture is stirred for 1 hour at 85 to 95° C., then for 2 hours at 105 to 115° C. and finally for 30 minutes at 125 to 130° C.

At 90° C., 1100 parts of water are stirred in within 5 to 10 minutes, and the mixture is allowed to cool.

The mixture is suctioned through a glass filter. The black, granular filter cake is washed with 5 x 200 parts of water and then suspended at 60 to 70° C. in 1800 parts of water. The batch is adjusted with sodium hydroxide solution to pH=5.0 to 5.5, mixed with 10 parts of active carbon, and stirred for 30 minutes at 70 to 75° C.

After suction-filtration and washing, the filter cake is once more stirred with 1800 parts of water for 30 minutes at 70 to 75° C., after having adjusted the pH value to 4.8 to 5.5. The undissolved material is suctioned off.

The two filtrates are combined and at 70 to 75° C. 400 parts of sulfuric acid of 50% strength are stirred in. The furandicarboxylic acid is separated, washed and dried. Yield: 121 parts.

What is claimed is:

1. Process for the manufacture of 2:5-furandicarboxylic acid by elimination of 3 molecular proportions of water from 1 molecular proportion of a tetrahydroxy-butane-dicarboxylic acid of the formula

HOOC—(CHOH)$_4$—COOH which process comprises first eliminating two molecular proportions of water from one molecular proportion of the tetrahydroxy-butane-dicarboxylic acid by heating the tetrahydroxy-butane-dicarboxylic acid in admixture with concentrated sulfuric acid in a first step at a temperature of 85 to 95° C., and in a second step at a temperature of 105 to 115° C., and then eliminating the third molecular proportion of water by heating the reaction mixture at a temperature ranging from 125 to 135° C.

2. Process for the manufacture of 2:5-furandicarboxylic acid by elimination of 3 molecular proportions of water from 1 molecular proportion of a tetrahydroxy-butane-dicarboxylic acid of the formula

HOOC—(CHOH)$_4$—COOH which process comprises first eliminating two molecular proportions of water from one molecular proportion of mucic acid by heating said dicarboxylic acid in admixture with concentrated sulfuric acid in a first step at a temperature of 85 to 95° C., and in a second step at a temperature of 105 to 115° C., and then eliminating the third molecular proportion of water by heating the reaction mixture at a temperature ranging from 125 to 135° C.

3. Process for the manufacture of 2:5-furandicarboxylic acid by elimination of 3 molecular proportions of water from 1 molecular proportion of a tetrahydroxy-butane-dicarboxylic acid of the formula

HOOC—(CHOH)$_4$—COOH which process comprises first eliminating two molecular proportions of water from one molecular proportion of saccharic acid by heating said dicarboxylic acid in admixture with concentrated sulfuric acid in a first step at a temperature of 85 to 95° C., and a second step at a temperature of 105 to 115° C., and then eliminating the third molecular proportion of water by heating the reaction mixture at a temperature ranging from 125 to 135° C.

4. The process of claim 3, wherein the third molecular proportion of water is eliminated by heating the reaction mixture at a temperature ranging from 128 to 133° C.

5. In a process for the manufacture of 2:5-furandicarboxylic acid by elimination of 3 molecular proportions of water from 1 molecular proportion of a tetrahydroxy-butane-dicarboxylic acid of the formula

HOOC—(CHOH)$_4$—COOH with concentrated sulfuric acid, the steps which substantially consist in first eliminating two molecular proportions of water from one molecular proportion of the tetrahydroxy-butane-dicarboxylic acid by heating the tetrahydroxy-butane-dicarboxylic acid in admixture with concentrated sulfuric acid in a first step at a temperature of 85 to 95° C., and in a second step at a temperature of 105 to 115° C., and then eliminating the third molecular proportion of water by heating the reaction mixture at a temperature ranging from 125 to 135° C.

References Cited by the Examiner

Yoder et al., Chemische Berichte, vol. 34 (1901), page 3447.

NICHOLAS S. RIZZO, *Primary Examiner.*